United States Patent

Ulrich et al.

[11] Patent Number: 6,112,663
[45] Date of Patent: Sep. 5, 2000

[54] METHOD FOR LOADING A PRINTING PLATE ONTO AN IMAGING CYLINDER USING A SUCTION/PRESSURE TABLE

[75] Inventors: Brian Ulrich, New Westminster; Christopher Stephen Dudra, Port Moody, both of Canada

[73] Assignee: Creo Products Inc., Burnaby, Canada

[21] Appl. No.: 09/285,183

[22] Filed: Mar. 25, 1999

[51] Int. Cl.[7] ............................ B41F 27/00; B41L 47/14; B25B 11/00; G03B 27/04; F16B 47/00
[52] U.S. Cl. ..................... 101/389.1; 101/477; 269/21; 355/97; 248/205.8; 248/363
[58] Field of Search ................. 101/389.1, 382.1, 101/474, 477, 480; 355/85, 97, 99; 108/50, 18; 269/21; 248/683, 684, 205.5, 205.6, 205.8, 309.3, 363

[56] References Cited

U.S. PATENT DOCUMENTS

| | | | |
|---|---|---|---|
| 4,362,805 | 12/1982 | Landsman | 430/200 |
| 4,375,285 | 3/1983 | Dennhardt | 271/11 |
| 4,394,085 | 7/1983 | Dennhardt | 355/3 R |
| 4,491,313 | 1/1985 | Schoen | 271/194 |
| 4,743,324 | 5/1988 | Boyce et al. | 156/215 |
| 5,124,745 | 6/1992 | Fischer et al. | 355/85 |
| 5,727,434 | 3/1998 | Dils et al. | 83/169 |

*Primary Examiner*—Kimberly Asher
*Attorney, Agent, or Firm*—Oyen Wiggs Green & Mutala

[57] ABSTRACT

A loading table for flexographic printing plates is disclosed wherein pneumatic suction is employed to secure the printing plate to the loading table and pneumatic pressure is employed to reduce the friction when conveying the printing plate from the loading table to an imaging cylinder. The loading table comprises a plurality of openings connected to a reversible pump. Pneumatic suction or pressure from the pump is transferred to the printing plate via the openings in the loading table. While immobilized on the loading table with pneumatic suction, the flexographic plates can be prepared for imaging by peeling the protective coating from the active layer. The coupling of the plate to the loading table surface facilitates such preparatory steps without excessive handling of the plate. After preparation, the pneumatic pressure is reversed and a thin layer of air is created underneath the plate reducing the friction and permitting simple transfer of the plate to an imaging cylinder for further processing.

1 Claim, 1 Drawing Sheet

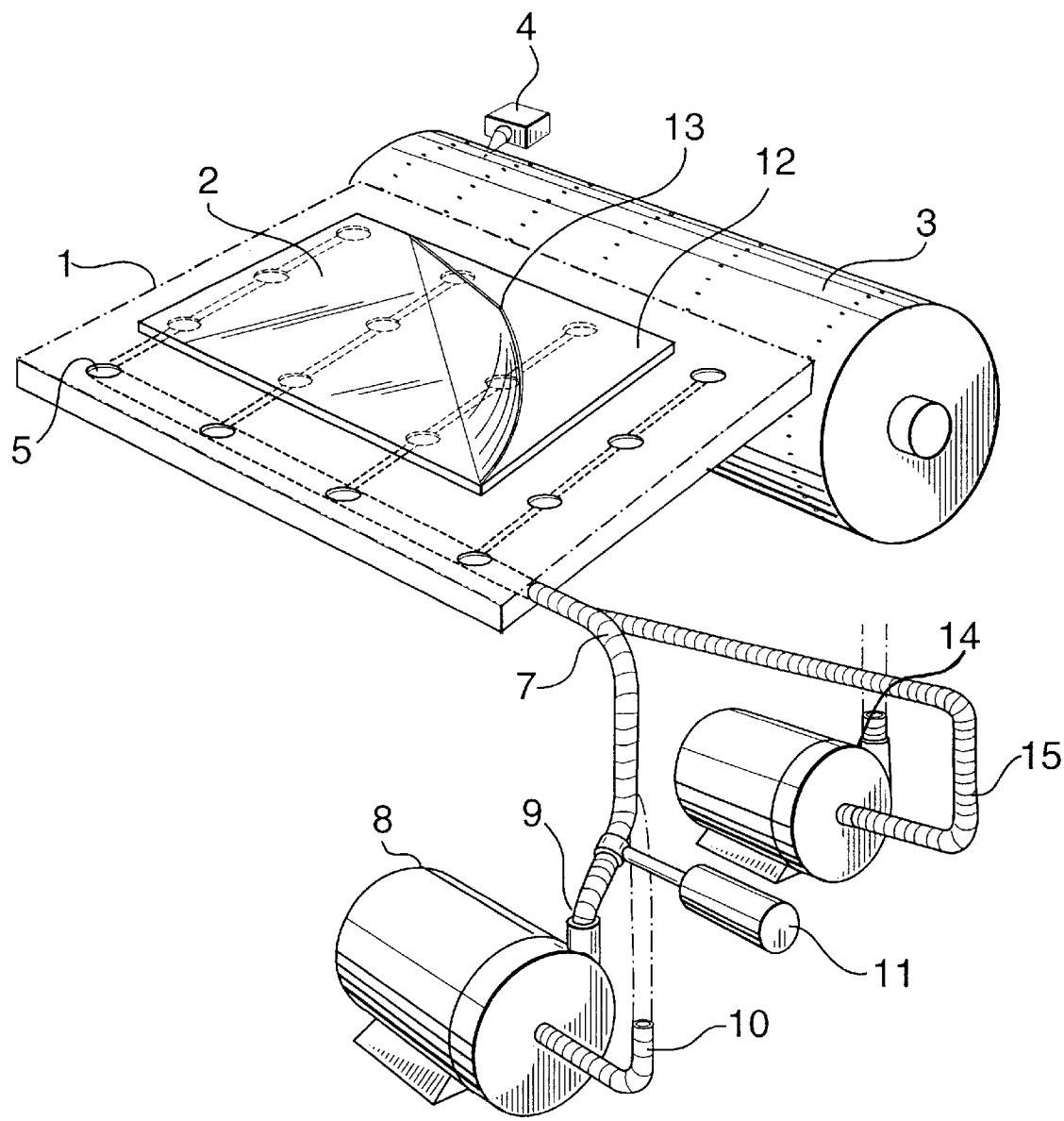
THE FIGURE

METHOD FOR LOADING A PRINTING PLATE ONTO AN IMAGING CYLINDER USING A SUCTION/PRESSURE TABLE

FIELD OF THE INVENTION

The present invention relates to the handling of materials where such handling requires both rigid position maintenance and low friction motion. Specifically, this invention relates to a pneumatic loading table as a part of a device for imaging flexographic plates, and a method for transferring the plates from the loading table to an imaging cylinder.

BACKGROUND OF THE INVENTION

Most flexographic printing plates available today are extremely fragile before they are imaged and cured. The active layer of the plates is typically made from a polymer which, prior to exposure and curing, is in a gelatinous state. Consequently, any handling of the plate prior to curing can lead to degradation in its image retention properties. It is desirable, for this reason, to minimize the invasiveness and the amount of any handling procedures. This is even more true for digital flexographic plates which have an ablative opaque coating on top of the photo-polymer.

For the above reasons, flexographic plates are frequently transported and stored with a protective coating over the active layer. Although the coating protects the active layer of the plate, it must be removed prior to imaging. To minimize any potential damage from handling, it is desirable to maintain the coating on the plate until immediately prior to imaging. A drawback associated with the protective covering is that it may be difficult and/or may require excessive handling to separate from the plate.

As such, there exists a need for a device which is capable of both rigidly securing a flexographic plate so that its protective coating may be removed and delicately conveying the plate onto an imaging cylinder without excessive handling.

In, general the prior art techniques for loading printing plates onto imaging and printing cylinders have been mechanical in nature employing cylindrical rollers. Such techniques are described in U.S. Pat. Nos. 4,281,922, 5,555, 812 and 5,634,406. Disposed on either side of the plate, the rollers compress the plate between them and convey it onto the printing cylinder. Such techniques are not suitable to convey uncured flexographic plates because the compression of the plate between the rollers could easily damage the plate's active layer, impairing its image retention properties.

Air tables and devices for effecting the movement of articles using fluids are well known. (See, for examples, U.S. Pat. Nos. 4,568,223 and 3,734,567). However, these devices do not disclose the use of pneumatic air tables alone to convey printing plates. Furthermore, these devices do not disclose the use of the pneumatic tables as both a securing device and a conveying device.

Accordingly, it is an object of the present invention to provide a flexographic plate imaging device equipped with pneumatic air table apparatus which is capable of delicately conveying a flexographic plate onto an imaging cylinder with a minimum amount of physical handling.

It is a further object of this invention to provide a flexographic plate imaging device equipped with a pneumatic air table which is capable of rigidly securing a flexographic plate so that its protective coating may be removed prior to the plate being conveyed onto an imaging cylinder.

It is another object of this invention to provide a method for transferring plates from a loading table to the imaging cylinder of a flexographic imaging device.

SUMMARY OF THE INVENTION

In accordance with the present invention, an apparatus for imaging a flexographic printing plate on an imaging cylinder is equipped with a loading table, positioned adjacent to the imaging cylinder. The loading table has a surface operative to receive a printing plate and a plurality of openings on the surface. In addition to the loading table, the device has a pump connected to the openings in the loading table surface. The pump is operative to provide reduced friction between the loading table surface and the printing plate by pressurizing the openings, such that the printing plate may be conveyed towards the imaging cylinder with a minimal amount of handling.

The pump may also be operative to immobilize the printing plate on the loading table surface by providing suction through the plurality of openings. Such immobilization may be useful to peel the protective coating from the external surface of the printing plate.

Alternatively, the device may contain a completely separate second pump to provide the immobilization function.

The invention also relates to a method of transferring a flexographic printing plate from a loading table onto an imaging cylinder. The method involves the steps of:

(a) receiving a printing plate on a loading table surface;

(b) immobilizing the printing plate on the loading table by providing suction through a plurality of openings in the loading table surface;

(c) peeling a protective coating from an exterior surface of the printing plate, exposing an active layer;

(d) reducing friction between the printing plate and the loading table surface by providing pressure through the plurality of openings;

(e) conveying the printing plate towards the imaging cylinder; and (f) transferring the printing plate onto the imaging cylinder.

BRIEF DESCRIPTION OF THE DRAWINGS

The FIGURE is a diagram of the apparatus in accordance with the present invention.

DESCRIPTION OF THE PREFERRED EMBODIMENT

Referring to the FIGURE the present invention is explained as follows. Plate 2, consisting of active layer 12 and protective coating 13, is placed on loading table 1. The top surface of table 1 has an array of openings 5 interconnected via connections(not shown) to a common hose 7. Hose 7 can be automatically connected to the pressure side 9 or the suction side 10 of fluid pump 8 using actuator 11. The side of the pump 8 which is not connected is vented to the atmosphere.

As mentioned above, most flexographic plates comprise an active layer 12 and a protective coating 13 which must be removed by peeling before the plate 2 is imaged. Prior to loading the plate 2 on the imaging cylinder 3, hose 7 is connected (by the action of actuator 11) to the suction side of fluid pump 8. The resulting suction causes the plate 2 to be held down to table 1 by the action of the vacuum, permitting the protective layer 13 to be peeled away without excessive handling. A second pump 14 having a suction side 15 which is in fluid communication with openings 5 may be provided to immobilize a plate 2 on table 1. When second pump 14 is operated it provides a suction through openings 5 and thereby substantially immobilizes a plate 2 present on table 1 to enable protective coating 13 to be stripped off of plate 2.

After layer 13 is removed, actuator 11 connects hose 7 to pressure side 9, causing the plate 12, to be lifted by air pressure. The pressurized air is incident on the substrate (not shown) on the bottom side of the plate 2 and, as a result, does not corrupt the exposed active layer 12. This "air bearing" effect allows the plate 2 to slide virtually friction free towards the imaging cylinder 3. Typically, the plate 2 is held to the imaging cylinder 3 by the action of vacuum, mechanical clamps, or adhesive tape in such a manner that the active layer 12 is exposed for imaging.

Once loaded onto the imaging cylinder 3, the plate 2 is imaged by the laser head 4. After imaging, the plate 2 is loaded back from cylinder 3 to table 1, which is still pressurized by air coming through hose 7. This allows the newly imaged plate 2 to glide easily back onto table 1.

The invention herein disclosed is beneficial in handling any delicate material wherein the procedures require both that the material be secured in place and that it be conveyed with low friction motion.

The invention has been described with reference to a particular embodiment, but it is understood that there may be slight variations to the embodiment, which are within the scope of the invention.

What is claimed is:

1. A method for loading a printing plate onto an imaging cylinder, said method comprising:

a) receiving said printing plate on a surface of a loading table;

b) substantially immobilizing said plate on said loading table surface by providing suction through a plurality of openings in said loading table surface;

c) peeling a protective coating from an exterior surface of said printing plate;

d) reducing friction between said printing plate and said loading table surface by providing pressure through said plurality of openings;

e) sliding said printing plate across said loading table surface toward said imaging cylinder; and f) transferring said printing plate onto said imaging cylinder.

* * * * *